(12) United States Patent
Perretta et al.

(10) Patent No.: US 9,742,561 B2
(45) Date of Patent: Aug. 22, 2017

(54) SECURE REMOTE AUTHENTICATION OF LOCAL MACHINE SERVICES USING SECRET SHARING

(71) Applicant: Spyrus, Inc., San Jose, CA (US)

(72) Inventors: Michael Perretta, San Jose, CA (US); Burton Tregub, Encino, CA (US)

(73) Assignee: SPYRUS, INC., San Jose, CA (US)

( * ) Notice: Subject to any disclaimer, the term of this patent is extended or adjusted under 35 U.S.C. 154(b) by 0 days.

(21) Appl. No.: 15/462,697

(22) Filed: Mar. 17, 2017

(65) Prior Publication Data

US 2017/0195118 A1 Jul. 6, 2017

Related U.S. Application Data

(63) Continuation-in-part of application No. 14/991,114, filed on Jan. 8, 2016, now abandoned.

(60) Provisional application No. 62/101,961, filed on Jan. 9, 2015.

(51) Int. Cl.
| | |
|---|---|
| *H04L 9/08* | (2006.01) |
| *H04L 9/06* | (2006.01) |
| *H04L 9/14* | (2006.01) |
| *H04L 29/06* | (2006.01) |
| *H04L 9/32* | (2006.01) |
| *H04L 9/30* | (2006.01) |

(52) U.S. Cl.
CPC ............ *H04L 9/085* (2013.01); *H04L 9/0643* (2013.01); *H04L 9/14* (2013.01); *H04L 9/30* (2013.01); *H04L 9/3231* (2013.01); *H04L 63/083* (2013.01); *H04L 63/0876* (2013.01)

(58) Field of Classification Search
CPC ......... H04L 9/085; H04L 9/0643; H04L 9/14; H04L 63/0876; H04L 9/3231; H04L 63/083; H04L 9/30
See application file for complete search history.

(56) References Cited

U.S. PATENT DOCUMENTS

| | | | | |
|---|---|---|---|---|
| 5,675,649 A | * | 10/1997 | Brennan | ................ H04L 9/085 380/286 |
| 9,489,542 B2 | * | 11/2016 | Miller | ..................... G06F 21/80 |
| 2002/0013898 A1 | * | 1/2002 | Sudia | ..................... G06Q 20/02 713/155 |
| 2002/0032866 A1 | * | 3/2002 | Suga | ....................... H04L 9/085 713/180 |

(Continued)

*Primary Examiner* — Darren B Schwartz
(74) *Attorney, Agent, or Firm* — Robert Rose; Law Office of Robert Rose

(57) ABSTRACT

A method for authentication of a computing device so that shares of a secret may be delivered, over a network that uses a communications protocol which does not require use of an address, and on which an authentication server is listening, comprising the steps of dividing the secret into a first share and a second share, or more; destroying the secret; transmitting the second share, together with a unique identifier, out of band to a pre-designated location; erasing the second share from the computing device; storing the first share at the computing device; broadcasting the unique identifier over the network; accepting a request over the network from an authentication server to initiate an authentication protocol; responding to the request; receiving the second share from the authentication server; and reconstructing the secret using the received second share and the stored first share.

11 Claims, 6 Drawing Sheets

(56) References Cited

U.S. PATENT DOCUMENTS

| | | | | |
|---|---|---|---|---|
| 2002/0164033 | A1* | 11/2002 | Rajasekaran | H04L 9/085 380/278 |
| 2003/0026432 | A1* | 2/2003 | Woodward | H04L 9/085 380/278 |
| 2003/0048906 | A1* | 3/2003 | Vora | G06Q 20/00 380/277 |
| 2007/0160198 | A1* | 7/2007 | Orsini | H04L 9/085 380/28 |
| 2007/0266261 | A1* | 11/2007 | Nishiguchi | G06F 21/6209 713/193 |
| 2007/0300293 | A1* | 12/2007 | Tsutsui | G06F 21/32 726/5 |
| 2008/0082817 | A1* | 4/2008 | Takahashi | G06F 21/31 713/155 |
| 2009/0060198 | A1* | 3/2009 | Little | H04L 9/34 380/278 |
| 2009/0077379 | A1* | 3/2009 | Geyzel | H04L 9/085 713/170 |
| 2009/0158052 | A1* | 6/2009 | Yasuda | H04L 63/068 713/189 |
| 2010/0054481 | A1* | 3/2010 | Jajodia | H04L 9/0897 380/284 |
| 2010/0287366 | A1* | 11/2010 | Araki | G06F 21/554 713/150 |
| 2011/0126291 | A1* | 5/2011 | Araki | H04L 9/085 726/26 |
| 2011/0320815 | A1* | 12/2011 | Matsunaka | H04L 9/0833 713/168 |
| 2012/0243687 | A1* | 9/2012 | Li | H04L 9/085 380/277 |
| 2012/0255030 | A1* | 10/2012 | Matsuo | H04L 9/085 726/26 |
| 2013/0010966 | A1* | 1/2013 | Li | H04L 9/0888 380/278 |
| 2013/0177157 | A1* | 7/2013 | Li | H04L 9/083 380/277 |
| 2013/0191632 | A1* | 7/2013 | Spector | H04L 9/083 713/155 |
| 2014/0013439 | A1* | 1/2014 | Koike | G06F 21/6218 726/26 |
| 2014/0337684 | A1* | 11/2014 | Resch | G06F 11/10 714/763 |
| 2015/0127946 | A1* | 5/2015 | Miller | G06F 21/6218 713/171 |
| 2017/0005797 | A1* | 1/2017 | Lanc | H04L 9/0894 |

* cited by examiner

SECURE REMOTE AUTHENTICATION OF LOCAL MACHINE SERVICES USING SECRET SHARING

This application claims the benefit of and incorporates by reference the text of U.S. Provisional Patent Application No. 62/101,961, filed Jan. 9, 2015, titled "Secure Remote Authentication of Local Machine Services Using a Self Discovery Network Protocol" and is a continuation-in-part of Non-Provisional application Ser. No. 14/991,114 filed Jan. 8, 2016, now pending.

FIELD OF INVENTION

The field of the invention is the secure boot-up of computing devices over a network and more specifically to methods and systems for secure authenticated log-on of computing devices during a boot sequence, in which a passcode to complete either boot-up or log-on does not exist anywhere in the system or network and must be dynamically reconstructed from secret shares obtained from one or more servers which are listening on the network.

BACKGROUND

The Internet has served as a disruptive technology among both social worlds and machine worlds, introducing new freedoms of access to information and remote control of devices. Innovations in mobile and industrial use of the Internet have been employed to access devices that are embedded within other systems and may be accessed and controlled remotely. This has developed into a market for the Internet of Things "IoT", which comprises computing devices that use the Internet as the communications transmission medium for collecting, transmitting and receiving data to control processes within the device, for example, home thermostats, medical instrumentation, controllers of pipelines and energy systems, and self-driving vehicles, to name only a few embodiments. The growth of disruptive Internet and communications technologies, however, introduces new threats to critical infrastructures implicating privacy, security, safety, and interoperability. Quite simply, the large number of computing devices connected through the Internet is a tantalizing target for hackers.

The growth of process control and monitoring of computing devices on the IoT, or more generally on any network, is characterized by an increasing number operating in a headless mode with no attachment to a human interface device such as a keyboard, display, or mouse; and therefor having no human intervention in their functioning. The problem of managing such computing devices is exacerbated not only by their growing ubiquity, but by their headless operation. For convenience, these headless computing devices are referred to herein as "HCD" (or in the plural as "HCDs"), but it will be readily apparent to one skilled in the art that such headless state is just a description and not a necessary condition for practice of the invention. In other words, HCD refers to a computing device, regardless of the presence, or lack thereof, of input means.

Cybercriminals have been known to insert latent malicious code into an HCD operating system, thereby allowing the malicious code opportunistic entry into the HCD's programs during the next reboot of the operating system. In order to thwart such attacks it is possible to place a clean copy of the operating system on a separate drive, preferably having a form factor of a USB flash drive, or within a Trusted Computing Base within the HCD itself. When that is done, however, it is advantageous to also have the external or internal drive encrypted and protected by a passcode. One example of an external encrypting flash drive with an operating system on-board is the WorkSafe Pro™ bootable Windows To Go™ flash drive from SPYRUS, Inc.

Encrypting flash drives and encryption protected Trusted Computing Bases are also useable in computation-intensive system process control applications in manufacturing, robotics and pharmaceutical plants and surveillance and monitoring applications in nuclear facilities or military operations where networks of HCDs may contain highly sensitive information or programs. All that is necessary, then, is to enter the appropriate passcode at reboot to permit the HCD to load a safe copy of the operating system or gain access to required confidential data or programs.

To minimize the opportunity window of potential vulnerability the HCD preferably remains off-line, and performs a reboot and reload of its operating systems and application programs and data when it comes on-line, either in response to a local command (such as turning on the local device) or command from a remote control center. Either case, however, requires entry of the required passcode to unlock the protected operating system and stored data.

Storage of the passcode in the clear on an HCD in either hardware or software is not an option, and because HCDs are often placed in hostile or dangerous high-risk environments, use of the Internet as the transmission medium to "reach back" to communicate with a remote command center in order to receive the passcode is risky.

Communicating with one or more remote control centers is also difficult because storing the IP address of one or more remote command centers at the HCD is inadvisable (as it exposes the remote centers to attack) or impracticable (as the information would be ephemeral and unavailable before reboot is complete). Manually entering the passcode at the local HCD is also not an option, either because the HCD lacks any input means, or requiring operator intervention is infeasible (due to the multiplicity of devices, or otherwise).

The ease of access to the Internet, for example by any of billions of smartphones or computers, has lowered any barrier to malicious cyberattacks on any computing and communications devices using the Internet for a transmission medium, many of which are part of critical infrastructures around the globe, including smart grid power systems, communications systems, manufacturing plants and hospital operating and patient recovery rooms. Cisco, Inc., predicts there will be 50 billion devices connected to the Internet by 2020 and that the global IoT economic value will be $19 trillion for companies and industries worldwide in the next decade. Across health-care applications, Internet of Things technology could have an economic impact of $1.1 trillion to $2.5 trillion per year by 2025.

The Center for Strategic and International Studies 2014 estimates that cyberattacks funded by nation-states with basically unlimited economic and technology resources can also account for the loss of 350,000 jobs in the U.S. and Europe. Worse yet, the threats to national security from attacks on IOT devices that will be used to control power grids, pipelines, communications systems, banking systems, and transportation vehicles represents threats to national security that are too devastating to be measured. Breaches can be executed by adversaries from all quarters. According to a 2014 study cyberattacks cost the global economy about $445 billion.

Independent of the IoT, the field of cryptography has seen development of means for secret sharing (also called secret splitting) which are methods for distributing a secret amongst a group of participants, each of whom is allocated a share of the secret. The secret can be reconstructed only when a threshold number of shares are combined together; in that case individual shares are of no use on their own.

For example, in one type of secret sharing scheme there is one dealer and n players. The dealer gives a share of the secret to the players, but only when specific conditions are fulfilled will the players be able to reconstruct the secret from their shares. The dealer accomplishes this by giving each player a share in such a way that any group of t (for threshold) or more players can together reconstruct the secret but no group of fewer than t players can. Such a system is called a (t, n)-threshold scheme, or a K of N secret sharing mechanism (with K being the threshold and N being the number of shares) as used in commonly owned patent Jueneman, et al., U.S. Pat. No. 9,049,010. Other forms of secret splitting or extensions thereof, including how to split a secret, will be known to those of ordinary skill in the art with reference to this disclosure. Reconstructing a passcode from such shares rather than storing and distributing passcodes, would greatly enhance the security of the overall system.

Therefore, there is a need for a method to maintain security for HCD logon by transmitting share information to HCDs from one or more remote servers and reconstructing the passcode only when needed.

SUMMARY

The invention meets this need by providing a method for secure downloading of shares needed for password reconstruction using a broadcast communication protocol which permits each HCD to securely communicate with any one of multiple servers.

DETAILED DESCRIPTION

The method of the invention will first be described. Specific embodiments will then be described. These are not meant to narrow the generality of the invention, which is usable with a broad range of devices, protocols, and circumstances.

Initialization

Figure 1A:
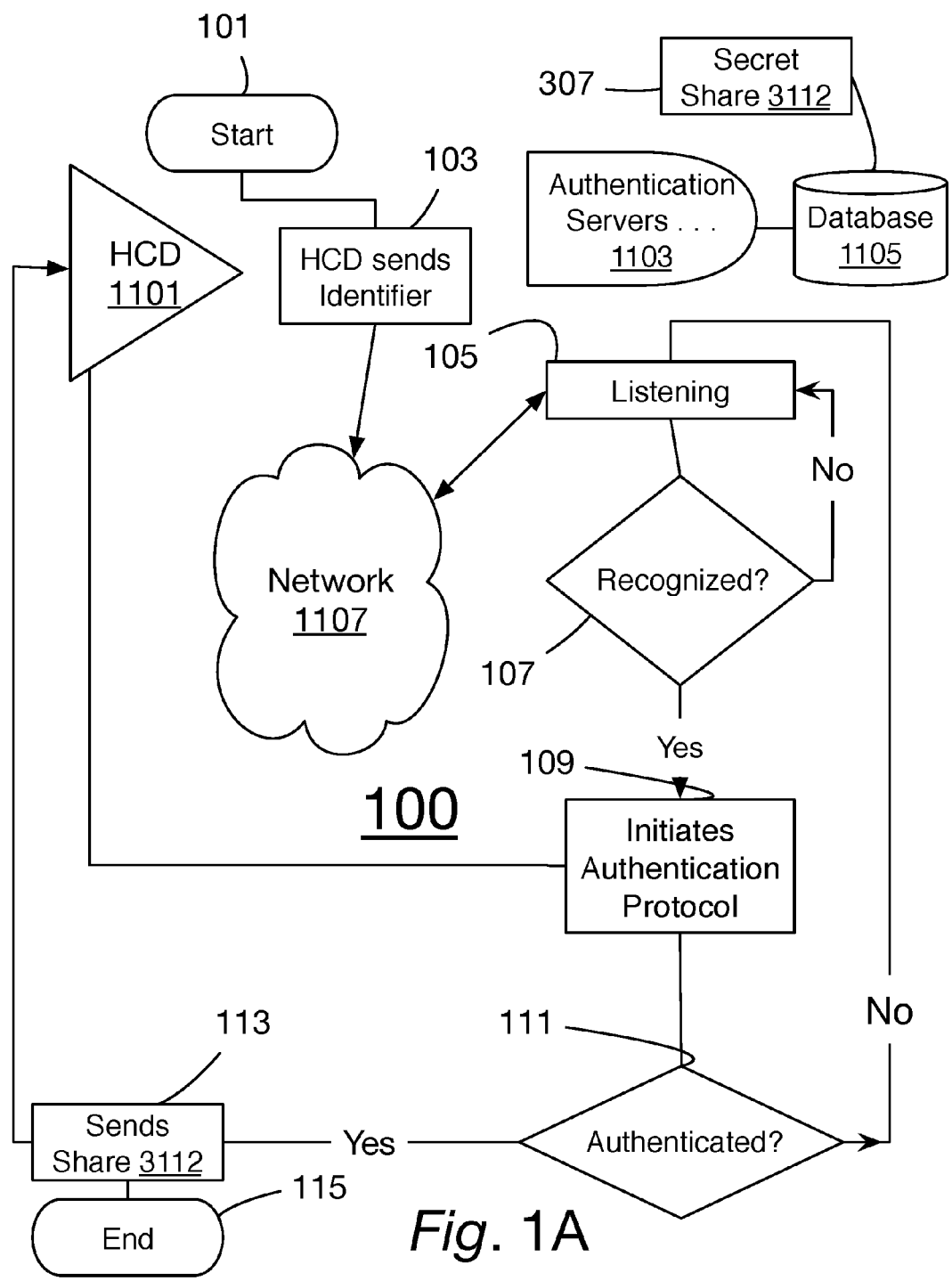
FIG. 1A is a flow diagram of one embodiment of the method of the invention.
Figure 3:
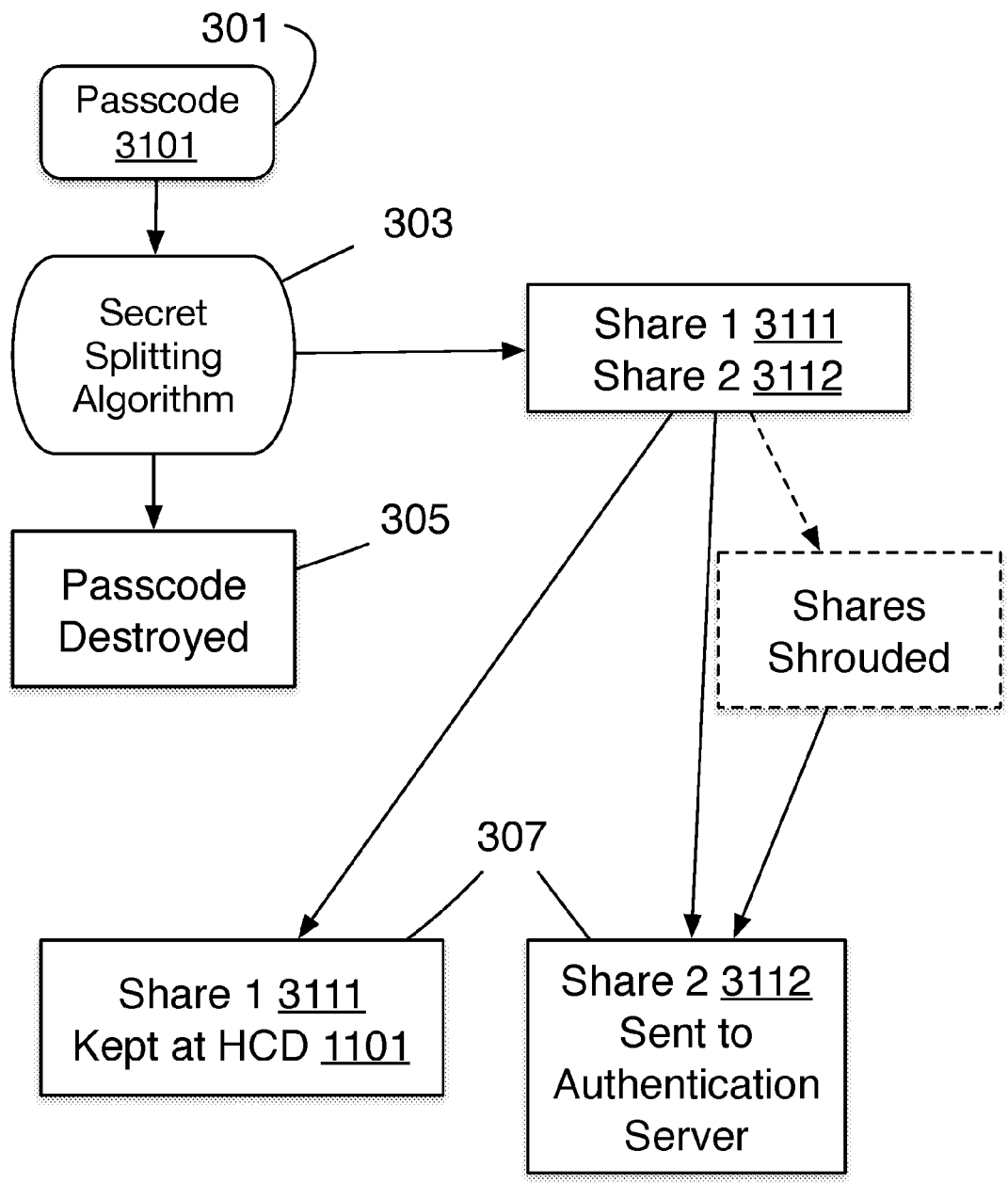
FIG. 3 is a flow diagram of an embodiment of the method of the invention using a secret sharing algorithm to distribute two secret shares.

With reference to FIG. 3 and FIG. 1A, when an HCD 1101 is initially shipped to an end user, or purchased in a retail environment, it is desirable that the device be delivered in a "raw" state so that in Step 301 the end user can create any passcode 3101 and public cryptographic key pairs that will be required by HCD 1101. In an alternate embodiment, passcode 3101 can be automatically generated in Step 301 with no operator involvement. In either case no passcode or private key information is controlled by anyone other than that end user. Further, as explained above, it is desirable to keep a copy of the device's operating system available in a Trusted Computing Base at the location of HCD 1101, accessible only by passcode, so that with that passcode the device can access the trusted computing base, and load the operating system stored therein to enable startup. This is analogous to keeping instructions in a vault which is accessible only with a physical key.

Frequently, computing devices separate bootup from access. In the typical case turning on the device initiates a hardware boot loader that causes an operating system to load, which then presents a roadblock screen to the user which requires a second passcode to enable access. It will be understood by one of ordinary skill with reference to this disclosure that the method described herein could be used for either or both of these stages, e.g., to unlock a Trusted Computing Base so that the HCD's boot loader can find a pristine version of the operating system to load, and then again to enable the HCD to unlock and grant access to the operating system of the HCD. Since the device in our illustration case is deployed in a network or system as "headless" and therefore operating autonomously without human input after initialization, it may be as a design choice that only one stage of passcode roadblock is required.

Thus, it is understood that Step 301 to provide a passcode can be constructed in multiple ways, and in fact passcode 3101 can refer to one or more passcodes. With reference to FIG. 3, at initial deployment of HCD 1101 (e.g., installation at the end user's environment) some means of creation of a passcode 301 must be employed. In one preferred embodiment a random passcode is generated (as will be evident, this is equivalent to computing a random or pseudo-random number). In that case human input of that passcode is not required and it does not need to be displayed or stored by the human user.

FIG. 3 describes one embodiment of secret sharing. In the simplest embodiment, in step 303 the passcode is split into two shares 3111 and 3112. In accord with how secret shares work, this would be a 2 of 2 split, or (2,2). In other words, both shares will be needed to reconstruct the passcode, but neither one by itself can do so. In step 305 the passcode is destroyed. Optionally, the shares are shrouded with some parameter unique to HCD 1101. Then, in step 307 share 3111 is stored at HCD 1101, and share 3112 is sent to Authentication Server 1103 (shown in FIG. 1A) to be stored in database 1105.

Figure 4:
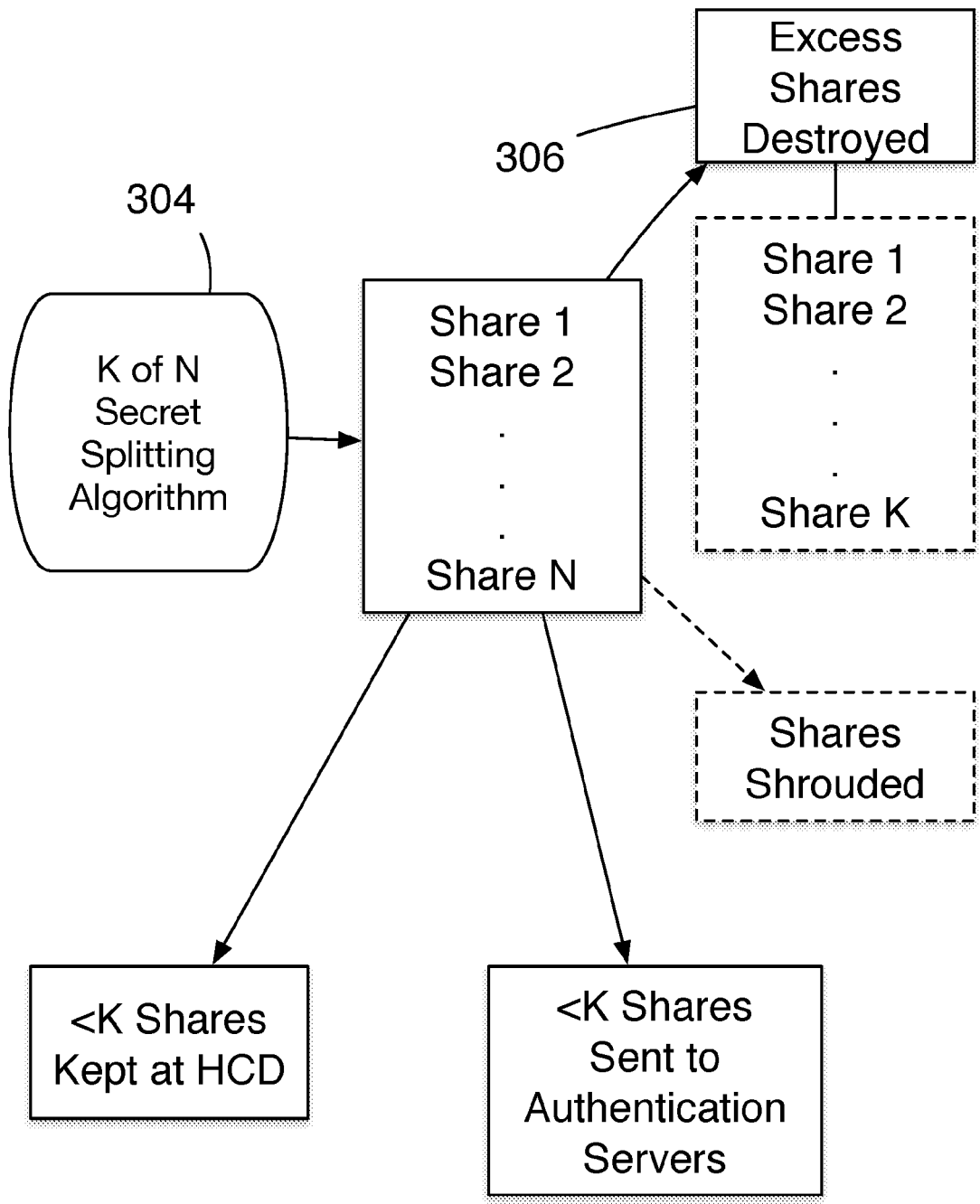
FIG. 4 is a flow diagram of a further embodiment of the method of the invention using a secret sharing algorithm to distribute multiple secret shares.

In a more complex embodiment shown in FIG. 4, Passcode 3101 is split into a set of N shares at step 304, using a K of N secret sharing algorithm as will be known to one of ordinary skill with reference to this disclosure. Once the set of N shares are created Passcode 3101 is destroyed as in the embodiment shown in FIG. 3, and is no longer kept at the HCD, nor anywhere else. In an alternate embodiment, only the set of K shares necessary to meet the threshold are kept, and the excess shares are destroyed. Alternately, the K of N algorithm could be constructed so that K=N and there would be no excess. Either as a consequence of the set up of the algorithm or after destruction of excess shares, in that further embodiment all extant shares would be necessary to reconstruct the passcode.

In one preferred embodiment either the set of 2 shares, N shares, or K shares undergoes a shrouding operation, wherein each of the individual secret shares is shrouded using an invertible transform such as XOR, the exclusive OR operator in Boolean algebra, with a different client identification parameter unique to HCD 1101 and a table of the relationships is maintained at HCD 1101. If Passcode 3101 is intended to be used for login after the Trusted Computing Base is accessed, the table of relationships may optionally be stored in the Trusted Computing Base. By the method of shrouding, none of the secret shares remain in their native unshrouded form anywhere in the system thus reducing vulnerabilities to attack. As examples of such client parameters, the shrouding might be done with the HCD's MAC address, the hash of the HCD firmware, the serial number of semiconductor chips within the HCD, the public key of the HCD or other HCD "fingerprint" data. Such shrouded secret shares would be unusable by any other HCD.

Preferably, a hash of selected client identifier parameters is created to label each HCD uniquely. There would be other methods to label HCDs, as will be known to those or ordinary skill. The set of the unique HCD identifier, a public key associated with the HCD, and one or more secret shares (e.g., 3112, etc.) are then transmitted to predetermined locations after which all information relating to the transmitted shares, or copies of such shares, are destroyed, such that the number of secret shares remaining at the HCD is less than the threshold K needed to reconstitute the destroyed passcode 3101. In other words, in case of compromise of the HCD, there would be insufficient information at the HCD to reconstitute passcode 3101. Optionally, in order to reach the condition that shares remaining at the HCD be less than K, a combination of destruction of excess shares and transmission of shares could be used. For example, if 6 shares were created, with a threshold of 4, then one share could be destroyed, and two shares could be transmitted to the remote servers, leaving less than 4 shares at the HCD. In another preferred embodiment, no more than K-1 shares should be transmitted outside the HCD, so that in case of compromise of the outbound transmission sufficient shares to reconstitute the passcode would not be obtained.

In one embodiment the set of the HCD unique identifier, the HCD public key and any secret shares are written to a physical device (perhaps a memory card) and sent via courier or physical delivery service to a predetermined location to be loaded on to an Authentication Server at a remote control center. In that embodiment, for example, the HCD might be delivered with an SD memory card, and after initialization the end user removes the card, places it in a pre-addressed envelope, and mails it. Or, in another embodiment, the HCD establishes a secure channel over the Internet to predetermined locations of remote servers and uploads the sets of data. In a still further embodiment, the storage location is unknown, and utilizing an Internet protocol similar to that described herein, a secure channel is established with an authenticated receiving site at a previously unknown location. In yet a further embodiment, the HCD establishes a channel over a data connection (such as LTE or 3G), and does not use any Internet connection to transmit the sets of data.

At this point in the method it will be evident that passcode security has been maintained. If one of the servers is breached and a single share is obtained it cannot be used to reconstruct passcode 3101, since K shares are required.
Retrieval of Shares Turning now to retrieval of the share so that the Passcode may be reconstructed, reference is made to FIG. 1A. After the initialization process is completed and the HCD's are deployed, an HCD may not "know" the IP address of the remote control center, and a means of broadcast over a network 1107 using a protocol which does not require knowledge of IP addresses is required (here a "self discovery network protocol"). Currently, one such protocol which meets this requirement is the User Diagram Protocol defined by RFC 768 written by John Postel and known as UDP, although other protocols may be used or be developed in the future which do not require knowledge of IP addresses and thus be usable with the invention, as will be evident to one of ordinary skill in the art with reference to this disclosure.

As explained above, the acronyms "HCD" and "HCDs" are meant to refer to computing devices whether or not they in fact have input means. This will also be apparent to one of ordinary skill with reference to this disclosure. In other words, being "headless" is not a necessary condition for the invention.

With reference to FIG. 1A, the method 100 begins in step 101 and in step 103 the HCD 1101 broadcasts a packet over network 1107 using a self discovery network protocol, the packet containing a unique identifier. For example, such unique identifier could be selected from a group of unique data consisting of a session nonce, the serial number or other machine "fingerprint" data, a network authorization code (such as is described in the Jueneman '010 patent referenced above), and the public key of the HCD, or a hash of thereof, or of any combination. Other unique identifiers are possible, as will be evident to one skilled in the art. In Step 105 one or more authentication servers 1103 each having a database 1105 listen to incoming packets and in step 107 when the identifier information matches an entry in their database they recognize the HCD and accept the packet and proceed to step 109, and otherwise do not recognize the HCD, reject the packet, and return control to the listening step 105.

In step 109 the authentication protocol may be as extensive as the circumstance requires. For example, the HCD 1101 can contain a known fixed key and a random challenge can be performed by the authentication server 1103. It can also employ a unique public key pair that the authentication server knows the HCD is in possession of. If the HCD does not have the private key the authentication will fail.

If successful, the HCD is authenticated and in step 113 may receive the share or shares needed to reconstruct the passcode. In a further embodiment, the authentication server may transmit other protected data to the HCD in step 113, in addition to the login passcode.

Figure 1B:
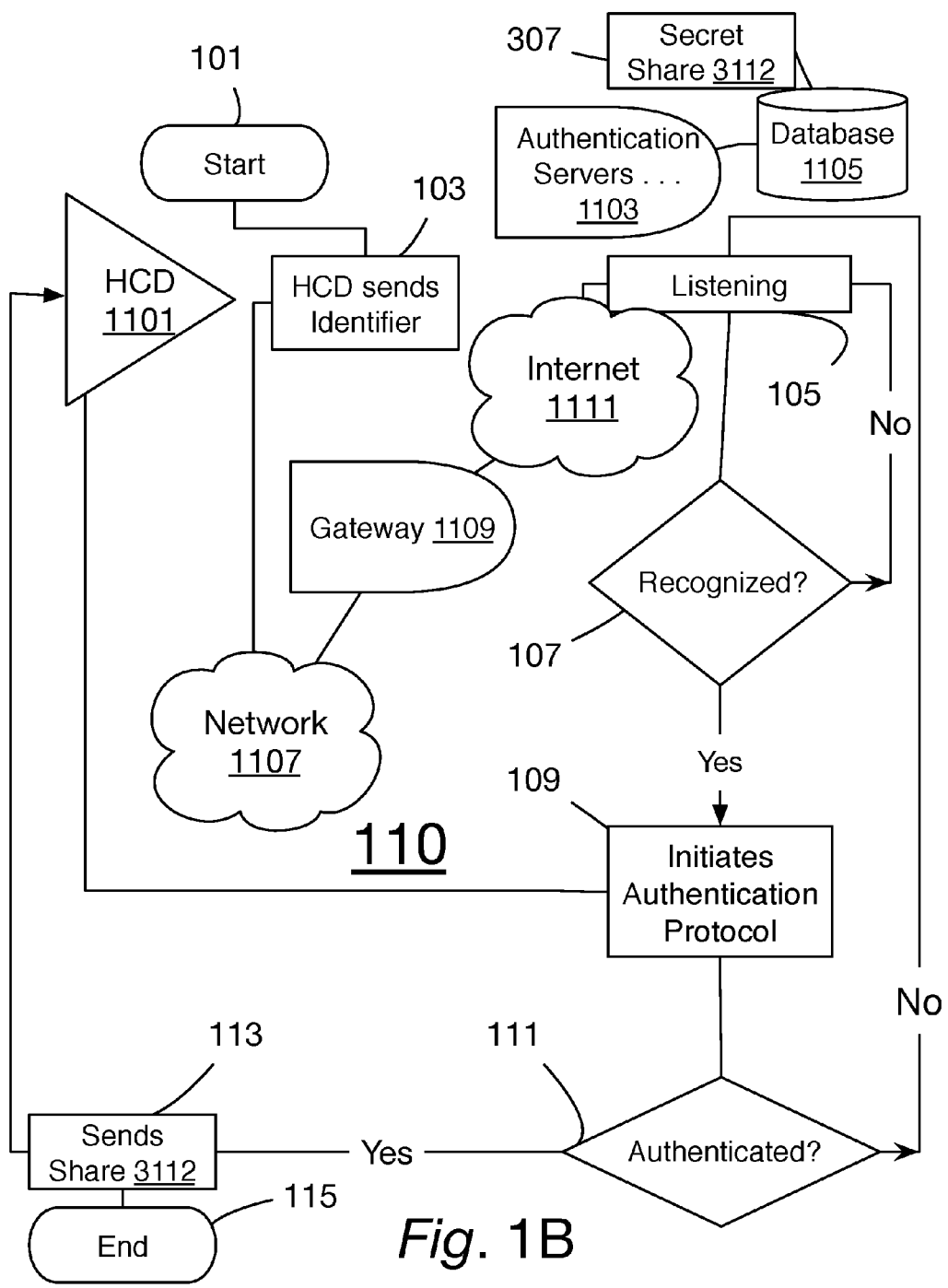
FIG. 1B is a flow diagram of another embodiment of the method of the invention.

In a still further embodiment 110 of the method, with reference to FIG. 1B, a gateway 1109 which knows the IP address of the authentication servers 1103 is listening on network 1107, and it rebroadcasts the packets over the Internet 1111 using any one of available IP protocols, to the known address of the one or more authentication servers.

Figure 2:
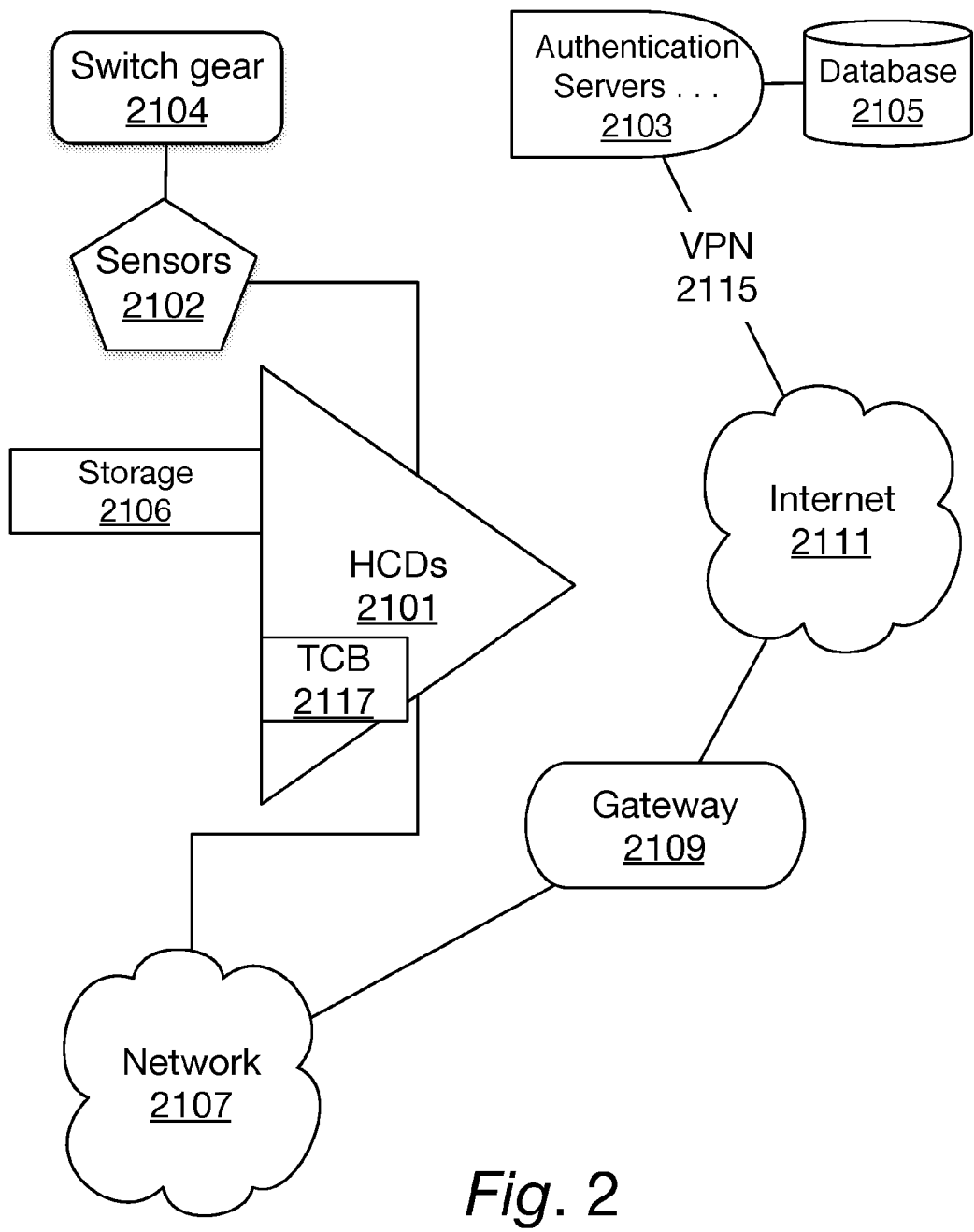
FIG. 2 is a schematic for one embodiment of secure remote authentication according to the invention.

With reference to FIG. 2, an embodiment of the invention as applied to HCDs in a nuclear power plant reactor system will be described. Here, the HCDs are connected to sensors for monitoring power transmission switchgear directing energy over different power grids.

One or more HCDs 2101 on network 2107 are respectively connected to sensor bundles 2102 which provide respective signals from nuclear reactor switchgear 2104 that route energy to different electrical transmission networks of a power grid. Storage 2106, which is advantageously encrypted or protected, or both, is either external and engaged with, or internal to, each of the one or more HCDs and contains the operating system, application programs, and other data for the respective HCDs and provides access to memory for defense against cyber attacks. In a preferred embodiment storage 2106 is removeably engaged, and has a form factor of a USB flash drive. As will be evident to one of ordinary skill in the art, such storage could be any type of data repository known now or in the future, including drives, flash memory, or the like. In a further embodiment, storage 2106 is bootable. Network 2107 is also connected to a network gateway 2109 to convert the protocols of network 2107 to the protocol of the Internet 2111 over which one or more VPN connections 2115 are created to connect to one or more authentication servers 2103. Each authentication server controls a database 2105 containing the authentication parameters in the form of keys, PINs or shares needed to reconstruct passcodes specific to HCDs 2101 log on policies.

HCDs 2101 (or any one or more of these) power up in pre-boot mode. Their individual boot loaders execute using the HCD's internal BIOS to connect to the network 2107 which passes the information through the network gateway 2109 to each of the authentication servers 2103 using the Internet 2111 as the transmission medium.

In one embodiment, the IP address of the one or more authentication servers is not known to the HCDs. In that case, gateway 2109 broadcasts out a UDP packet of information over the VPN connections 2115.

In that embodiment, this broadcast packet contains a unique identifier which is composed of a hash of HCD client parameters and the public key of the broadcasting HCD. The authentication servers listen to incoming packets and when the identifier information matches an entry in their database they accept the packet, and otherwise reject the packet.

The server which has accepted the packet, in that embodiment, then uses a public key challenge response protocol (or other authentication protocol) to establish a secure point-to-point connection with the HCD. If successfully completed, a shrouded share is sent to the HCD where the necessary passcode is reconstructed.

In a further embodiment, one or more of the HCDs may incorporate a trusted computer base TCB 2117 to protect critical security parameters. As with storage 2106, the TCB could be internal or external to the HCD. In a further embodiment, it could be removably engaged with the HCD, and in a still further embodiment could contain storage 2106. The TCB, broadly, is a set of cryptographic protection mechanisms that enforces a security policy so that access to resources such as storage for an operating system, programs and data, or computing resources, cannot be achieved unless specific rules and procedures are followed. The Trusted Computer System Evaluation Criteria from the United States Department of Defense (also referred to as the "Orange Book") defines a TCB as "the totality of protection mechanisms within a computer system . . . the combination of which is responsible for enforcing a security policy. It creates a basic protection environment and provides additional user services required for a trusted computer system." An appropriately designed cryptographic token can, for example, contain a TCB. Appropriate design might include features such as a tamper proof case, nonmodifiable firmware, and zeroization of sensitive data upon intrusion detection. A secure operating system is another example of a TCB.

Although superseded (e.g., by Common Criteria for Information Technology Security Evaluation) reference to the Orange Book will be understood by one skilled in the art with reference to this disclosure as a broad reference to that portion of a computing system which is responsible for enforcing a security policy.

If a TCB is employed it will require an access code to gain access to it, and this is a further example of the sort of information that could be reconstructed using shares.

Embodiments of the present invention may be implemented in hardware, or as software modules running on one or more processors, or in a combination thereof. That is, those skilled in the art will appreciate that special hardware circuits such as Application Specific Integrated Circuits (ASICs) or Digital Signal Processors (DSPs) may be used in practice to implement some or all of the functionality of all components of the present invention. It should be noted that the described embodiments are exemplary rather than limiting the present invention. Substitute embodiments may be designed by those skilled in the art without departing from the scope of the claims enclosed.

Reconstruction of Passcode

Figure 5:
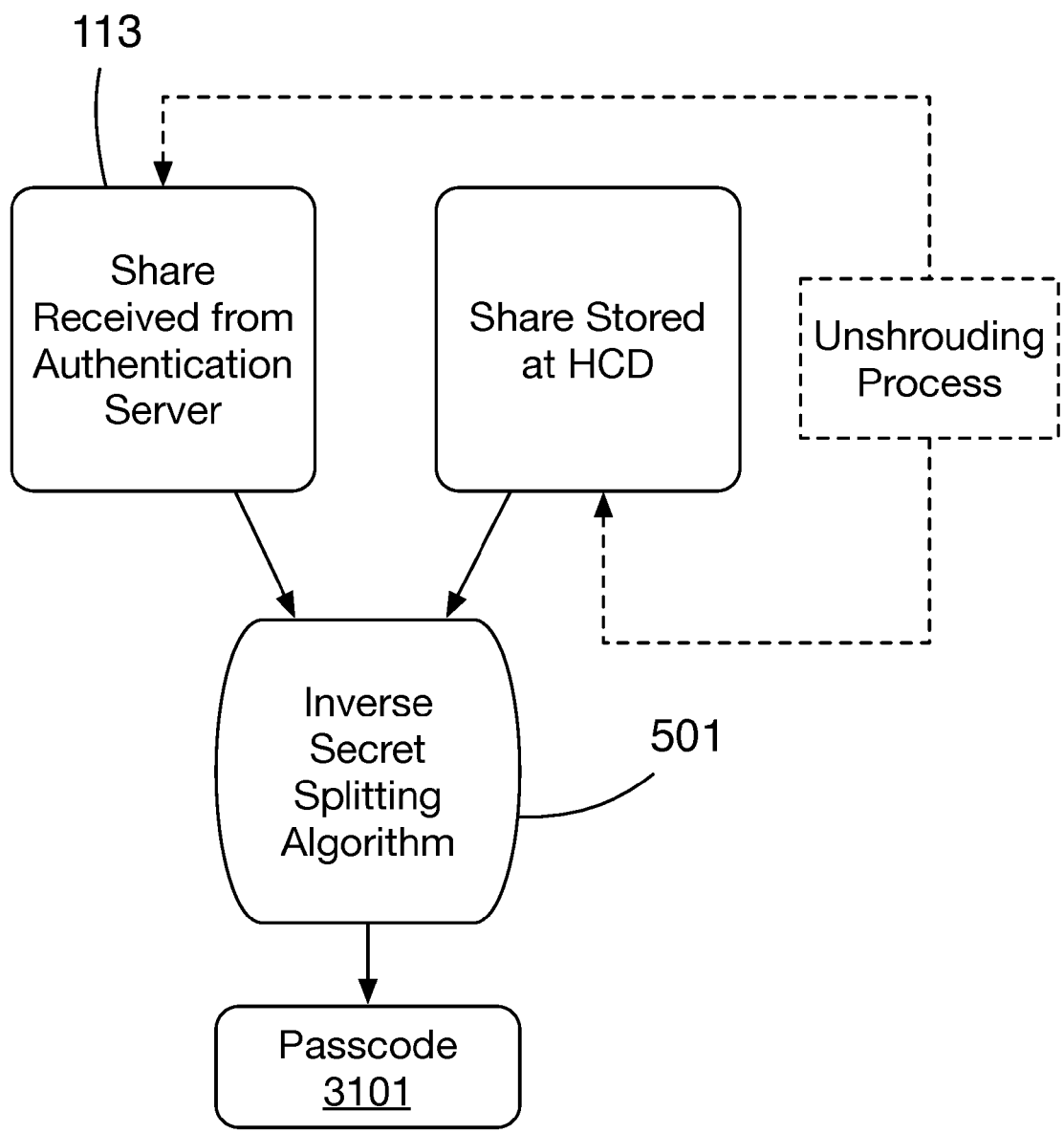
FIG. 5 is a flow diagram of the method to reconstruct a passcode from secret shares.

Having received shares from an Authentication Server in Step 113, with reference to FIG. 5, the HCD must proceed with reconstruction of the passcode 3101. The received shares, together with the stored shares, must be un-shrouded if necessary through an inverse process that will be understood by those of ordinary skill. Then, in step 501 an inverse secret sharing algorithm is employed as a function of the unshrouded received shares and the unshrouded stored shares, with an output of passcode 3101. One preferred technique for recovering the passcode is to employ a reverse Shamir secret sharing algorithm with the Lagrange polynomial interpolation method, well known to those skilled in the cryptographic art, on the unshrouded shares.

In any embodiment, there is a distinct advantage over prior art where passcodes or tokens for each client are stored with potentially hundreds or thousands of remote authentication servers that may be present in an IoT "Internet of Things" network, thus leaving them vulnerable to stolen password security breaches and brute force attacks from cybercriminals. In the invention, there are no passcodes, no sign-on credentials or tokens, nor any objects or digital values that can be used to boot up an HCD stored anywhere.

The invention claimed is:

1. A method for authentication of a computing device having a copy of its operating system stored in a protected location over a network on which an authentication server is listening, comprising the steps of:

dividing a secret, at the computing device, into a first share and a second share;

destroying the secret after the dividing step;

transmitting the second share not using the network, together with a unique identifier, to a pre-designated location;

erasing, after the transmitting, the second share from the computing device;

storing the first share at the computing device;

broadcasting the unique identifier over the network;

receiving the second share over the network from the authentication server; and reconstructing the secret using the received second share and the stored first share;

accessing, using the reconstructed secret, the protected location and obtaining the copy of the operating system; and booting the computing device with the obtained copy of the operating system.

2. The method of claim 1, further comprising the unique identifier selected from the group of unique data consisting of a serial number, machine fingerprint data, a network authorization code, a public key, and a session nonce.

3. The method of claim 2, further comprising hashing part or all of the unique data to construct the unique identifier.

4. The method of claim 1, further comprising shrouding of the first and second shares.

5. The method of claim 1, where the protected location is a trusted computing base.

6. The method of claim 1, where the protected location is external to the computing device.

7. A method for authentication of a computing device having a copy of its operating system stored in a protected location over a network on which one or more authentication servers are listening, comprising the steps of:
- dividing, at the computing device, a secret into N shares such that a threshold number of shares represented by a number K, being less than N, will be required to reconstruct the secret;
- destroying the secret after the dividing step;
- transmitting X of the N shares not using the network, X being less than K, together with a unique identifier, to one or more pre-designated locations;
- erasing, after the transmitting step, the X transmitted shares from the computing device until Y shares remain, such that X+Y equals K;
- storing the Y remaining shares at the computing device;
- broadcasting the unique identifier over the network;
- receiving the X transmitted shares over the network from one or more of the authentication servers;
- reconstructing the secret using the received X transmitted shares and the stored Y remaining shares;
- accessing, using the reconstructed secret, the protected location and obtaining the copy of the operating system; and
- booting the computing device with the obtained copy of the operating system.

8. The method of claim 7, further comprising, prior to the transmitting, hashing part or all of the unique identifier.

9. The method of claim 7, further comprising, prior to the transmitting, shrouding one or more of the X transmitted shares.

10. The method of claim 7, where the protected location is a trusted computing base.

11. The method of claim 7, where the protected location is external to the computing device.

* * * * *